United States Patent [19]

Peterson

[11] Patent Number: 5,282,648

[45] Date of Patent: Feb. 1, 1994

[54] INFLATABLE BODY AND HEAD RESTRAINT SYSTEM

[75] Inventor: Leslie D. Peterson, Phoenix, Ariz.

[73] Assignee: Simula Inc., Phoenix, Ariz.

[21] Appl. No.: 891,833

[22] Filed: Jun. 1, 1992

[51] Int. Cl.⁵ .............................................. B60R 21/18
[52] U.S. Cl. ...................... 280/733; 244/122 B;
    280/730 R; 280/740; 280/743 R; 280/743 A;
    297/484
[58] Field of Search ............. 280/728, 730, 733, 735,
    280/736, 740, 742, 743; 297/483, 484; 244/122
    AG, 122 B

[56] References Cited

U.S. PATENT DOCUMENTS

| | | | |
|---|---|---|---|
| 3,682,498 | 8/1972 | Rutzki | 280/733 |
| 3,841,654 | 10/1974 | Lewis | 280/733 |
| 3,905,615 | 9/1975 | Schulman | 280/733 |
| 3,948,541 | 4/1976 | Schulman | 280/733 |
| 4,348,037 | 9/1982 | Law et al. | 280/733 |
| 5,018,762 | 5/1991 | Suzuki et al. | 280/742 |
| 5,039,035 | 8/1991 | Fitzpatrick | 280/730 R |

FOREIGN PATENT DOCUMENTS 3-92451  4/1991  Japan ..................... 280/736

*Primary Examiner*—Eric D. Culbreth
*Attorney, Agent, or Firm*—Kirkland & Ellis

[57] ABSTRACT

The present invention relates to an inflatable air bag apparatus attached to a harness restraint system in a vehicle which inflates if an impact sensor detects an impact. The apparatus comprises an bladder attached to the harness's shoulder strap. The sides of the bladder wrap around the shoulder strap and are folded on top of the shoulder strap. When an impact is detected, the impact sensor transmits an electrical signal which ignites the gas generator, and inflates the bladder. In a preferred embodiment, the bladder member comprises three chambers, a central chamber and two side chambers. The chambers are formed by two vertical webs that divide the bladder into the central chamber and the side chamber. The webs are fabricated from permeable material, such that the side chambers inflate before the central chamber inflates, thus stabilizing the air bag apparatus.

19 Claims, 7 Drawing Sheets

INFLATABLE BODY AND HEAD RESTRAINT SYSTEM

BACKGROUND

1. Field of the Invention

The present invention relates to safety apparatus for restraining the head and body of the occupant of a vehicle to reduce the extent and severity of injuries during a crash of the vehicle. More specifically, it relates to an inflatable air bag system attached to the occupant's safety belts that removes any slack in the safety belts, distributes crash loads over a larger area, and provides chin support to reduce head and neck movement upon impact.

2. Background of the Invention

Conventional safety belts are designed to protect the occupants of vehicles such as automobiles, airplanes, helicopters, trains, trucks, boats and ships from primary injuries during an accident. Primary injuries are injuries caused by the initial impact of the occupants against the interior of the vehicle. However, the protection provided by conventional safety belts against even primary injuries may be inadequate. For example, slack safety belts may lead to unnecessarily serious primary injuries. Moreover, the safety belts themselves may often be responsible for secondary injuries. Secondary injuries are injuries caused by the restraint system, or by the body as it recoils after the initial impact. For example, if the load from the safety belts is directed over small areas of the occupant's body, the safety belts themselves may cause serious injuries. Finally, even if a restraint system successfully prevents the displacement of the occupant's torso, displacement of the head may still occur, resulting in neck and/or chest injuries.

U.S. Pat. Nos. 3,948,541 and 3,905,615 to M. Schulman, disclose an inflatable body and head restraint system, wherein a bladder member is securely affixed to shoulder straps and a lap belt. The bladder member has chin, chest and pelvic bags. Upon impact, the bladder member automatically inflates to cushion the pelvic and chest areas and to prevent forward rotation of the head.

These systems suffer from a series of severe drawbacks. First, upon inflation the bladder tends to roll out from its position under the shoulder straps, as shown in FIGS. 1a-1c. Since the bladder is stowed under the harness, it is not fully deployed before the load is applied to the straps. In a crash, there is significant load on the strap, preventing the underlying bag from lifting the strap uniformly away from the occupant. Instead, the bag tends to deploy in the direction of least resistance, so that it rolls out to one side of the strap.

Second, the seams and the webbing of the air bag tend to split during inflation. Upon impact, the harness exerts great force against the occupant's body. Because the bladders are underneath the straps, part of the bladder is constricted by the harness, resulting in high pressure in the other parts of the bladder. The abnormally high pressure in these portions of the bladder leads to seam and web splitting and, consequently, to failure of the bladder system.

Third, the gas generator used to inflate the bladders in the Schulman system is located in the lap belt, interfering with access to the lap belt and causing pelvic pain upon impact.

Finally, the chest bag allows too much rotation of the head and neck. The location of the gas generator under the lap belt has also caused structural failure of the lap belt buckle.

Simple inflatable body restraints are also disclosed in U.S. Pat. No. 3,682,498 to W. Rutzki and U.S. Pat. No. 4,348,037 to B. Law et al. Both patents disclose inflatable protective devices that are located in or under the safety harnesses to which they are attached. As described above, these inflatable devices are subject to rollout and seam or web splitting or inadequate occupant protection when inflate.

SUMMARY OF THE INVENTION

The present invention comprises an inflatable air bag system whose bladder members are stowed partially underneath and partially on top of the harness. The portion on top of the harness lies folded on a shoulder strap facing away from the occupant. Each side of the uninflated bladder is folded on top of the belt. Folding the side portions of the bladder on top of the belt allows the sides of the air bag to deploy initially without displacing the harness strap and without being subject to the strap's constrictive force.

The air bag apparatus is connected to a crash sensor. When a collision occurs, the crash sensor sends an electrical signal to the gas generator, igniting the generator and thus inflating the bladders. The gas generator is located inside the bladder on top of the shoulder strap.

The generated gas passes through manifold ports in the air bag, located laterally on either side of the housing, into the two folded side portions of the bladder. As gas flows through the manifold ports, both sides of the air bag unfold from their positions on top of the shoulder harness. The manifold system ensures equal inflation of the wrapped-around side portions of the bladder.

The side portions of the bladder comprise two chambers which inflate to sit on either side of the harness strap. Each side chamber is defined by the front and rear walls of the side portion of the bladder and by an internal vertical web attached to the top and bottom inner surfaces of the air bag. The inner side chamber, i.e., the side chamber directly below the occupant's head, comprises a head support lobe which, when fully inflated prevents excessive head and neck displacement during a crash. In a preferred embodiment, the inner side chamber is folded on top of the outer side chamber, so that it inflates first. The internal vertical webs are fabricated from permeable material. The volume between the two vertical webs also comprises a single central chamber located directly behind the harness strap and between the inner and outer side chambers.

The manifold ports and webs are designed to provide the correct inflation sequence to properly inflate the bladder. Thus, the side chambers on either side of the harness strap are inflated first by the gas entering through the manifold ports. Because the central chamber is only inflated by gas passing through the permeable vertical webs, the central chamber inflates only after the two side chambers have inflated. This configuration increases the stability of the bladder and avoids rollout. The already-inflated side chambers on either side of the harness prevent the central portion of the bladder from slipping out from under the harness when it finally inflates. Moreover, the three-chamber configuration also prevents the seams and the webs of the bladder from splitting because neither of the side chambers will have been subject to the disproportionately high pressure caused by strap constriction characteristic of conventional air bags. Furthermore, the vertical webs also control the shape of the bag to maintain a flat surface against the occupant's body and to maximize dispersal of harness load forces.

The bladder begins at the shoulder and may extend down to the mid-torso of the occupant. When inflation begins, the internal pressure created by the gas generator forcibly blows open a cover around the undeployed air bag. As described above, the two side chambers inflate first. The head support lobe also inflates to restrict head movement and prevent neck injuries.

Accordingly, it is an object of the present invention to provide a restraint apparatus that inflates on impact to protect the occupant of a vehicle, to compensate for slack in the safety belt system, and to hold the occupant securely in his or her seat.

It is another object of the present invention to provide an inflatable air bag system integrated into the restraint straps of the vehicle's safety belt system, providing convenient access to all vehicular controls.

It is a further object of the present invention to provide a safe and effective air bag system that can be easily donned, and allows for simple entry and exit from the vehicle.

It is a further object of this invention to provide an inflatable restraint system wherein the configuration of the bladder system prevents roll-out and seam splitting.

It is a further object of this invention to provide an inflatable restraint system with a gas generator located so as to minimize pelvic-area pain and injury, and prevent structural damage to the lap belt buckle or to the harness connectors.

It is a further object of this invention to provide an inflatable restraint system that distributes harness crash loads over large areas of the occupant's body, thus minimizing pain and injury.

It is a further object of this invention to provide an inflatable restraint system which prevents excessive displacement of the occupant's head and neck during impact, and which does not exert excessive force upon the occupant's neck upon inflation.

These and other objects of the present invention are described in greater detail in the detailed description, the appended drawings, and the attached claims.

DETAILED DESCRIPTION OF THE INVENTION

Figure 1A:
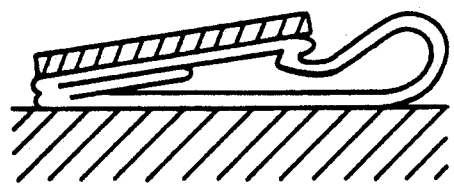
FIGS. 1a–1c are schematics showing the deployment sequence of prior art air bags.
Figure 1B:
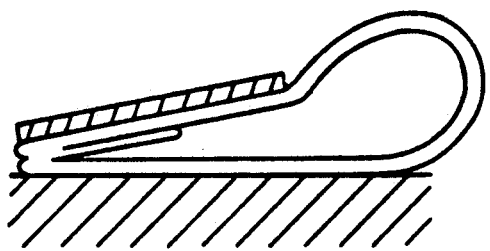
Figure 1C:
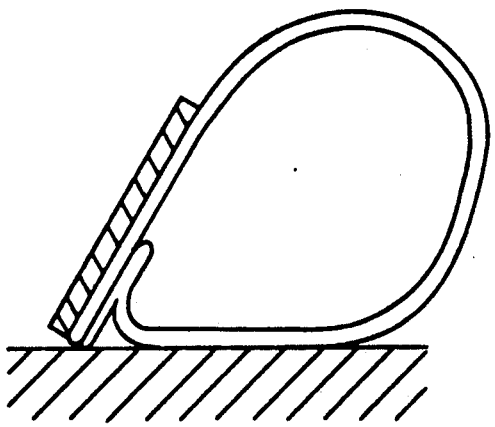
Figure 2:
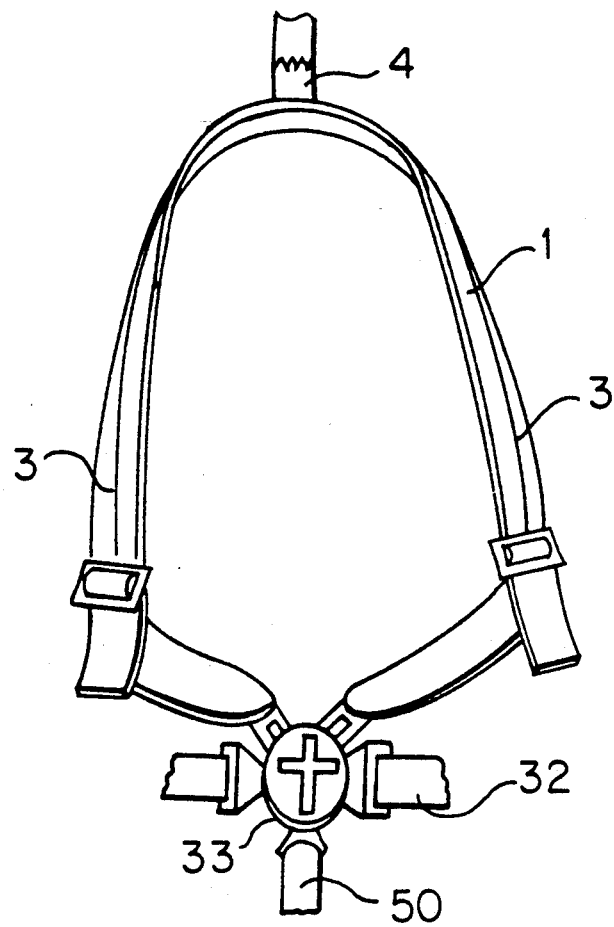
FIG. 2 shows a front view of the present invention in the uninflated state.

The preferred embodiment of the present invention is shown in FIG. 2. The restraint system 1 of the present invention is shown in the uninflated state. It includes two shoulder straps 3 and a lap belt 32, as well as central strap 4. Central strap 4 is also referred to as an inertia reel lead-in strap.

Shoulder straps 3, lap belt 32, and central strap 4 are formed from conventional webbing material such as nylon, Dacron ® (a synthetic polyester textile), or material such as Murdock polyester type X-854 or X-921. Shoulder straps 3 can be formed from one continuous strap, connected at the back of the neck to a single central strap 4. Central strap 4 is connected to a conventional inertia reel. The distal ends of the lap belt 32 are attached to the seat, e.g., by anchors (not shown). The proximal ends of lap belt 32 and both shoulder straps 3 comprise fittings which attach the harnesses to a buckle 33. The buckle 33 is anchored to the seat by a short strap 50, commonly referred to as a negative-G strap.

Figure 3A:
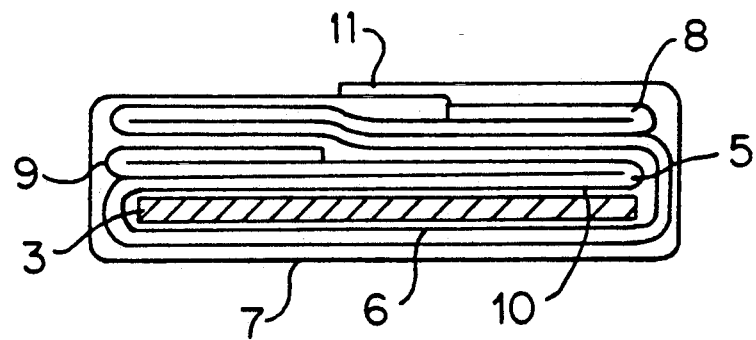
FIG. 3a shows the present invention with the side portions of the bladder folded on top of the belt.
Figure 3B:
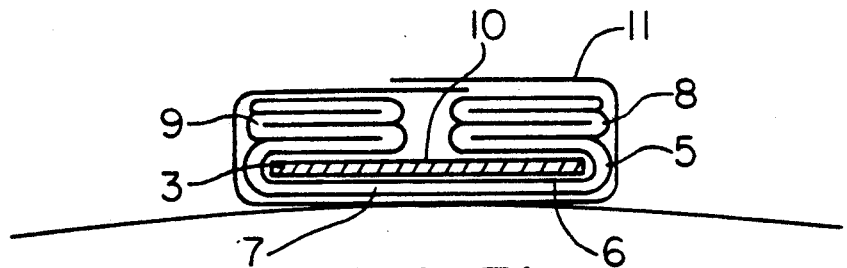
FIG. 3b shows an alternate fanfold method of stowing the side portions of the bladder on top of the belt.

As shown in FIGS. 3a–e, each shoulder harness comprises a bladder 5. Bladder 5 is formed from an impregnated fabric, such as neoprene-coated nylon, that is relatively impervious to gas. The bladders are attached directly to shoulder straps 3, e.g., by sewing. The central portion 7 of bladder 5 is attached to the rear face 6 of shoulder strap 3. Central portion 7 of bladder 5 extends to side chambers 8 and 9, which wrap around shoulder strap 3 to the front face 10 of shoulder strap 3. The side chambers are stowed on the front face of the shoulder harness 3. FIG. 3a shows a preferred method for stowing the bladder, in which the outer side portion 9 is folded first, and then inner side portion 8 is folded on top of outer side portion 9. This configuration allows inner portion 8, which comprises a head support lobe 31 (see FIG. 4a) to inflate first. The side chambers can also be stowed in a Z-shape or fanfold configuration, as shown in FIG. 3b. Before deployment, the bag is stowed within a cover 11 which is closed by means such as a hook-and-loop fastener. When the bladder inflates, the internal pressure of the gas produced by the gas generator forcibly opens the cover.

Figure 3C:
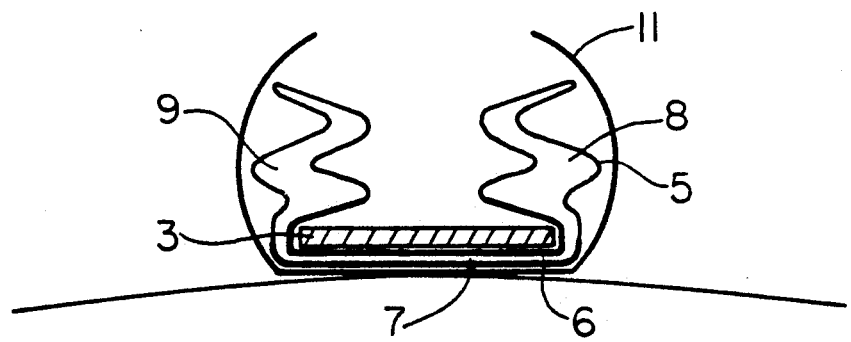
FIGS. 3c–3e show the deployment of the bladder of the present invention.
Figure 3D:
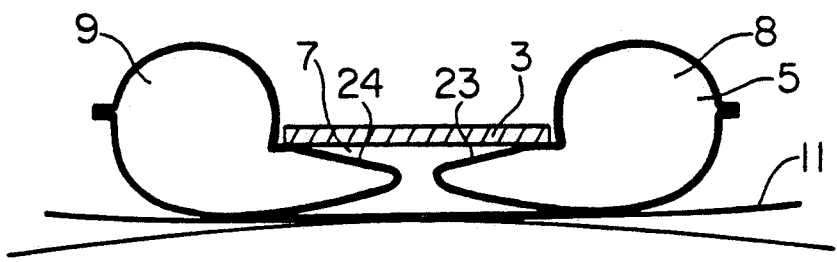
Figure 3E:
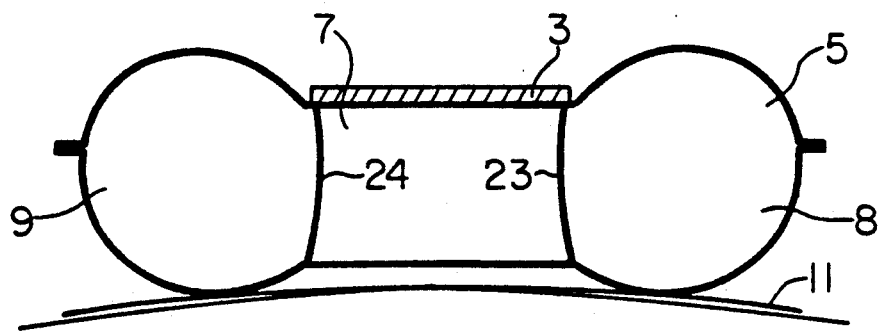

FIGS. 3c to 3e show the deployment of bladder 5. In FIG. 3c, side portions 8 and 9 have just started to deploy while central portion 7 remains stowed beneath shoulder strap 3. Cover 11 has opened to allow deployment. FIG. 3d shows that the inflation of side portions 8 and 9 is almost complete when central portion 7 starts to inflate. FIG. 3d also shows vertical webs 23 and 24 during the initial deployment. FIG. 3e shows bladder 5 fully deployed. Shoulder strap 3 is now lifted away from the occupant's body by central portion 7. Side portions 8 and 9 remain fully inflated, and vertical webs 23 and 24 are shown forming the partitions between central portion 7 and side portions 8 and 9.

Figure 3F:
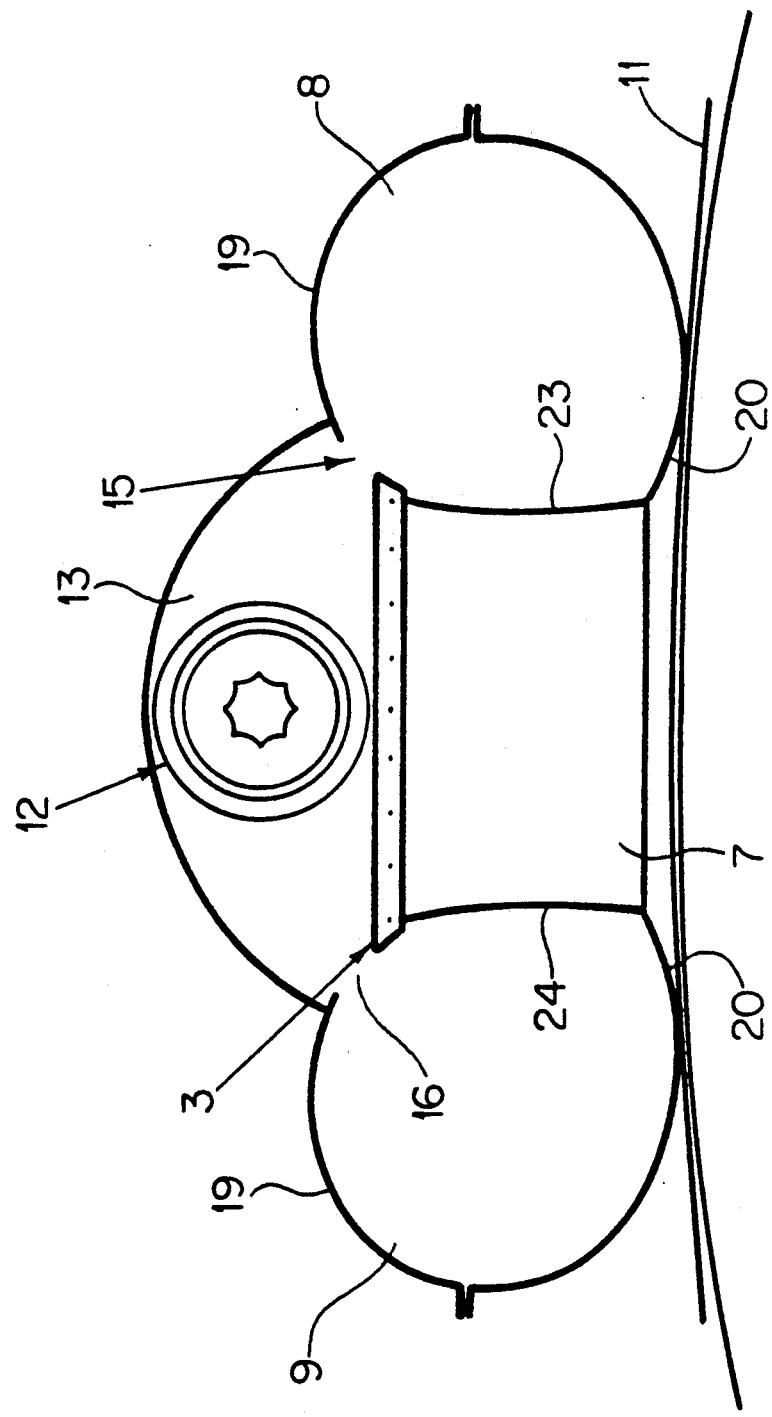
FIG. 3f is a cross-section similar to the cross-section of FIG. 3e, but taken through the gas generator manifold.

As shown in FIG. 3f, the gas generated by gas generator 12 enters gas generator manifold 13 and exits through manifold ports 15 and 16 located laterally on either side of gas generator 12. The gas enters the two side chambers 8 and 9. Side chambers 8 and 9 are defined by front wall 19 and rear wall 20 of bladder 5 and by vertical webs 23 and 24, located at either side of the central portion 7 of bladder 5. Vertical webs 23 and 24 are fabricated from permeable material. Webs 23 and 24 may also include openings to allow increased flow of gas into the central portion 7 of the bladder. The central portion 7 of bladder 5 lies underneath shoulder strap 3. The vertical webs 23 and 24 are attached to the inner surfaces of both front wall 19 and rear wall 20 of bladder 5, thereby stabilizing bladder 5 after inflation.

Figure 3G:
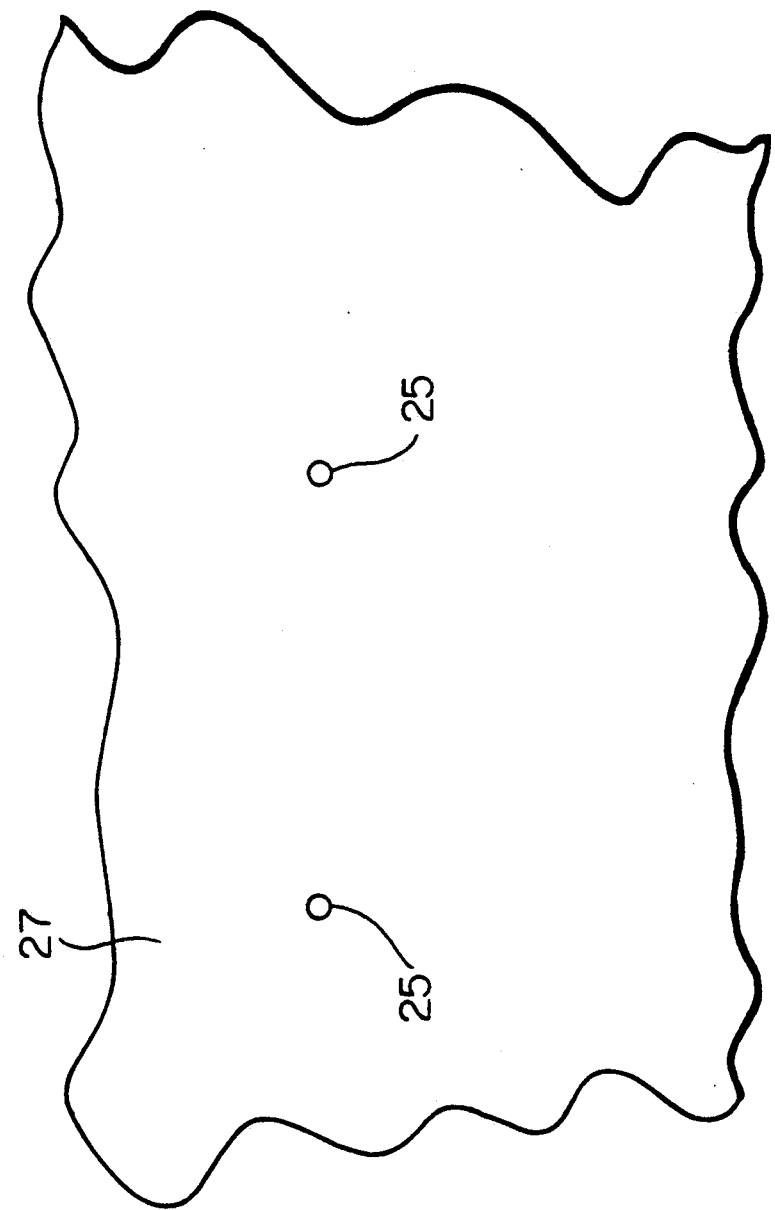
FIG. 3g is a schematic of a portion of a web, illustrating the holes therein.

As gas flows through manifold ports 15 and 16 to inflate side chambers 8 and 9, gas from chambers 8 and 9 flows at a controlled rate through and around permeable vertical webs 23 and 24 to inflate an central chamber 7. Central chamber 7 is formed by vertical webs 23 and 24, the front wall 19 of bladder 5, and the rear wall 20 of bladder 5. Thus, side chambers 8 and 9 act to stabilize bladder 5 around shoulder strap 3 before central chamber 7 starts to inflate. The controlled flow of gas from side chambers 8 and 9 to central chamber 7 can be achieved using webs fabricated from permeable materials. Openings at either end may be used to allow the gas to flow around the webs. The webs could also be fabricated from impermeable material having openings or holes therein as illustrated by holes 25, shown symbolically as dots in FIG. 3g. FIG. 3g illustrates a portion 27 of vertical web 23 or vertical web 24.

As inner chamber 7 inflates, shoulder harness 3 is lifted away from the body of the occupant and between inflated side chambers 8 and 9, thereby dispersing the force from shoulder harness 3 over the entire back surface 20 of bladder 5, cushioning the occupant from injury by the shoulder strap, and eliminating any slack between the shoulder strap and the occupant.

Figure 4A:
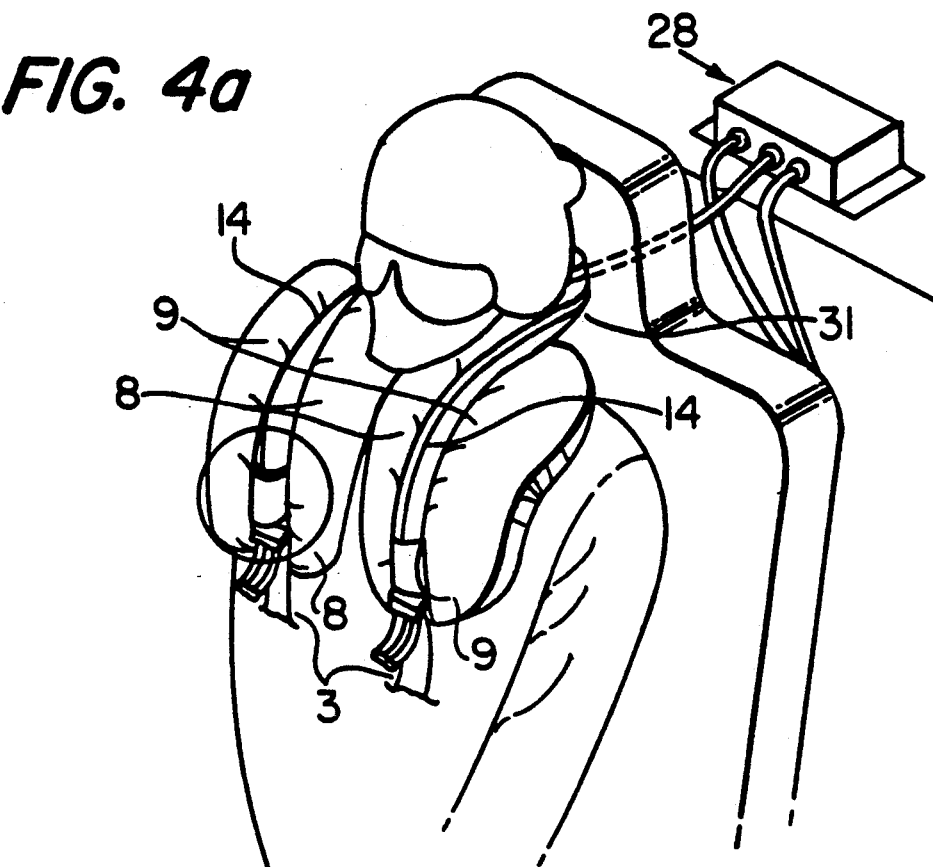
FIG. 4a shows a perspective view of the present invention in the inflated state, as it is worn by the occupant.
Figure 4B:
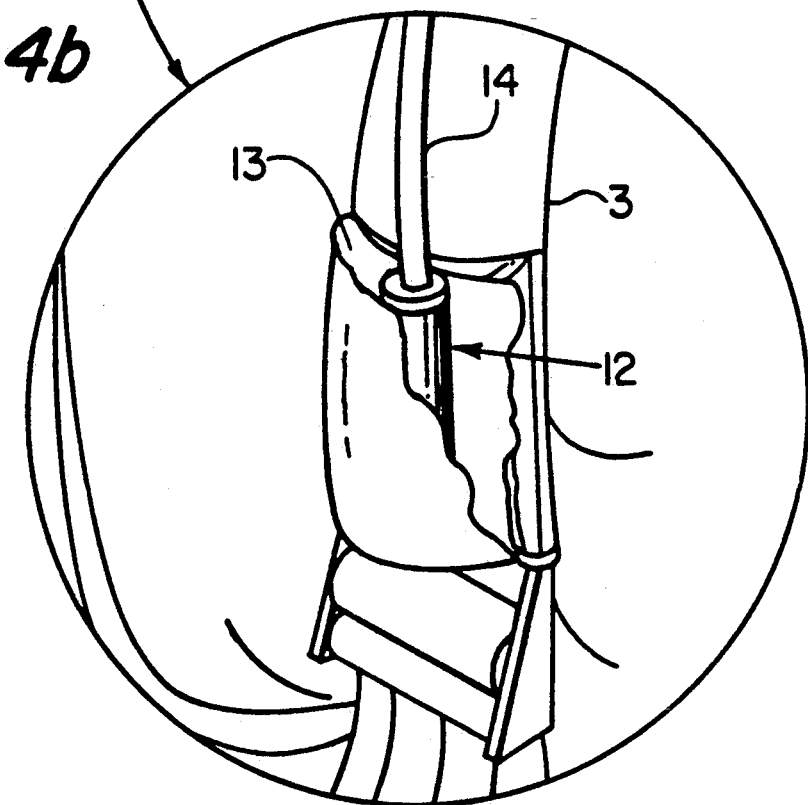
FIG. 4b is a more detailed view of a portion of FIG. 4a, showing the gas generator positioned on the shoulder strap.

The present invention is shown in the inflated state on an occupant in FIGS. 4a and 4b. FIG. 4a shows the present invention as it is worn by the occupant. FIG. 4b is a more detailed view of FIG. 4a, showing gas generator 12 in manifold 13 positioned over the central chamber on top of the front surface of shoulder strap 3. Gas generator 12 is connected by electrical cable 14 to crash sensor 28. Electrical cable 14 runs vertically along the front face of shoulder strap 3 from gas generator 12 to the crash sensor. When the crash sensor detects an impact, it sends a signal through electrical cable 14 to gas generator 12, igniting an initiator and releasing a non-toxic gas.

The top portion of the inflated inner side chamber 8 of each air bag 5 also extends to form a head support lobe 31, best shown on the occupant's left side in FIG. 4a. The inner and outer side chambers must be defined with reference to FIG. 4a, because only FIG. 4a includes a drawing of the occupant. In FIG. 4a, side chamber 8 is the inner side chamber, i.e., the side chamber below the occupant's head and neck. Side chamber 9 is the outer side chamber, i.e., the side chamber next to the occupant's arm. Side chamber 9 is folded on top of shoulder strap 3, and then side chamber 8 is folded on top of side chamber 9, so that side chamber 8 inflates first, thus inflating head support lobe 31 as quickly as possible. Each head support lobe 31 must be large enough to prevent excessive forward head and neck displacement.

Figure 5:
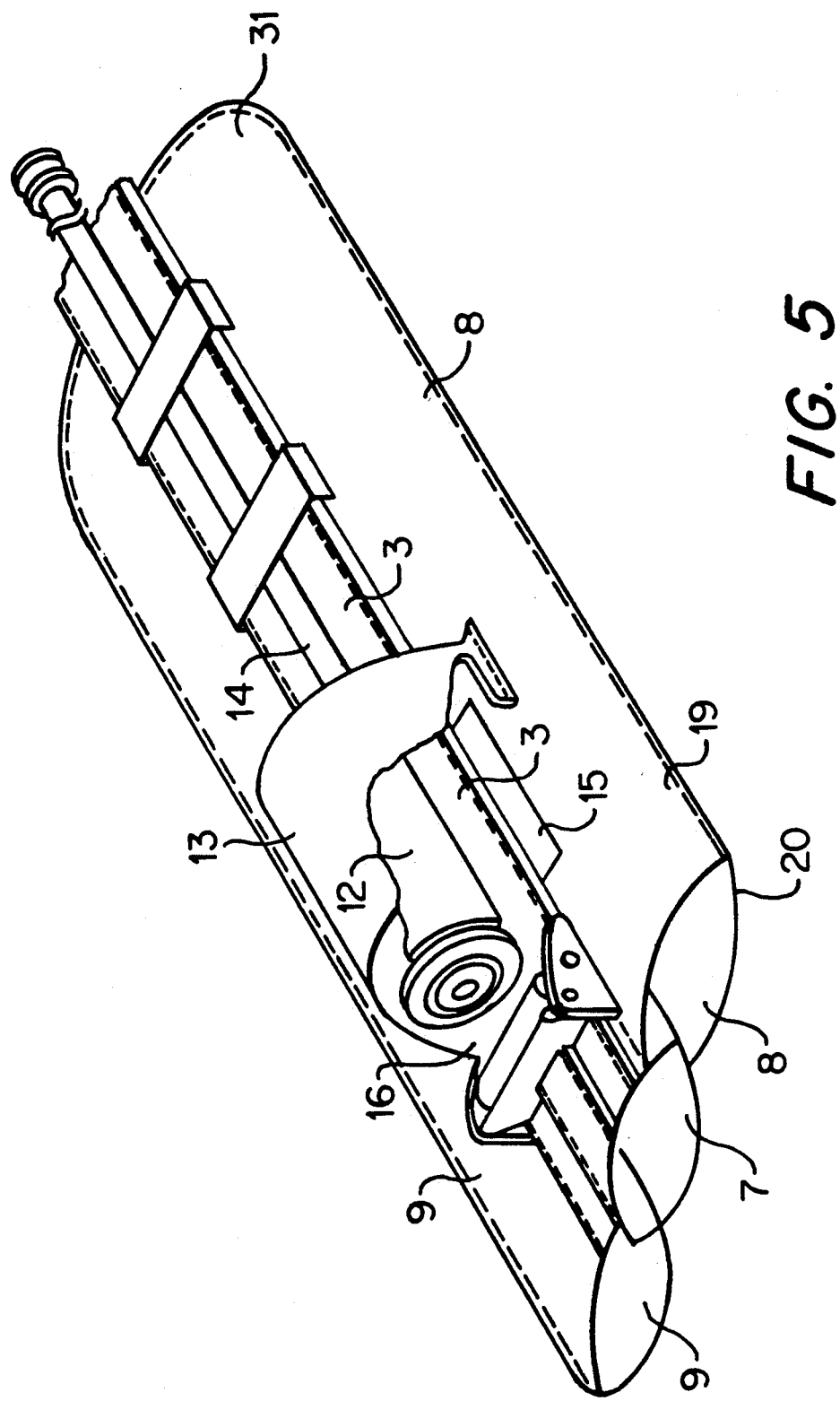
FIG. 5 shows a detailed perspective and cross-sectional view of a partially inflated restraint.

FIG. 5 is a detailed perspective and cross-sectional view of a partially inflated harness restraint. FIG. 5 shows central chamber 7, inner side chamber 8, outer side chamber 9, gas generator 12, manifold 13, and cable 14 mounted on shoulder strap 3, at an early stage of inflation. When the bladder is fully inflated, head support lobe 31 bulges out to support the occupant's head.

The foregoing disclosure of a preferred embodiment of the present invention has been presented for purposes of illustration and description. It is not intended to be exhaustive or to limit the invention to the precise form disclosed. Many variations and modifications of the embodiment described herein will be obvious to one of ordinary skill in the art in light of the above disclosure. The scope of the invention is to be defined only by the claims appended hereto, and by their equivalents.

What is claimed is:

1. A vehicle occupant restraint system, comprising:
    (a) at least one shoulder strap having a front surface and a back surface;
    (b) one normally uninflated bladder having a vertical central portion, a vertical inner side portion and a vertical outer side portion, said bladder comprising two vertical webs extending across the bladder, said webs forming a vertical central chamber in the central portion of the bladder, a vertical inner side chamber in the inner side portion of the bladder, and a vertical outer side chamber in the outer side portion of the bladder, the vertical central portion of the bladder being attached to the back surface of each said at least one shoulder strap, wherein the vertical inner and outer side portions of said bladder extend around said at least one shoulder strap such that each side portion lies folded on the front surface of said shoulder strap;
    (c) one housing positioned on the front face of each of said at least one shoulder strap, said housing comprising an airtight manifold having two ports, one port leading into said vertical inner side chamber and one port leading into said vertical outer side chamber;
    (d) at least one gas generator means positioned within each of said at least one housings on the front face of each of said at least one shoulder strap for generating gas to inflate said bladder member, wherein the housing comprises no ports leading directly into the vertical central chamber, such that the vertical central chamber is fluidly connected to the gas generator only through the vertical inner side chamber and the vertical outer side chamber;
    (e) an impact sensor means electrically connected to each of said gas generator means; and
    (f) means for controlling the flow of gas in the bladder such that the vertical inner side chamber in the vertical inner side portion of the bladder and the vertical outer side chamber in the vertical outer side portion of the bladder inflate before the vertical central chamber in the central portion of the bladder inflates.

2. The vehicle occupant restraint system of claim 1, wherein said vertical webs are fabricated from permeable material, such that the vertical webs comprise the means by which the flow of gas in the bladder is controlled such that the inner and outer side portions of the bladder inflate before the central portion of the bladder inflates.

3. The vehicle occupant restraint system of claim 1, wherein said vertical webs have a plurality of holes such that the vertical webs comprise the means by which the flow of gas in the bladder is controlled such that the inner and outer side portions of the bladder inflate before the central portion of the bladder inflates.

4. The vehicle occupant restraint system of claim 1, comprising two shoulder straps, a left shoulder strap and a right shoulder strap, each shoulder strap having a normally uninflated bladder having a vertical central portion, a vertical inner side portion and a vertical outer side portion, the front surface of the vertical central portion of each bladder being attached to the back surface of each shoulder strap, wherein the vertical outer side portion of each bladder extends around each shoulder strap to lay folded on top of the front surface of each shoulder strap, and the vertical inner side portion of each bladder extends around each shoulder strap to lay folded on top of the vertical outer side portion.

5. The vehicle restraint system of claim 4, wherein each bladder further comprises an upper lobe, the upper lobe on the left shoulder strap cooperating with the upper lobe on the right shoulder strap to support the occupant's head and to limit displacement of the head and neck upon inflation.

6. The vehicle restraint system of claim 1, comprising two shoulder straps, a left shoulder strap and a right shoulder strap, each shoulder strap having a normally uninflated bladder having a vertical central portion, a vertical inner side portion and a vertical outer side portion, each bladder being in contact with the back surface of each shoulder strap, wherein the vertical outer side portion of said bladder extends around each shoulder strap to lay folded on top of the front surface of each shoulder strap, and the vertical inner portion extends around each shoulder strap to lay folded on top of the vertical outer portion, further comprising two vertical webs forming a vertical central chamber in the central portion of each bladder, a vertical inner side chamber in the inner side portion of each bladder, and a vertical outer side chamber in the outer portion of each bladder.

7. The vehicle restraint system of claim 6, wherein the inner chamber of each bladder further comprises an upper lobe, the upper lobe on the left shoulder strap cooperating with the upper lobe on the right shoulder strap to support the occupant's head and to limit displacement of the head and neck upon inflation.

8. The vehicle restraint system of claim 6, wherein said vertical webs are fabricated from a permeable material, such that the vertical webs comprise the means by which the flow of gas in the bladder is controlled such that the inner and outer side portions of the bladder inflate before the central portion of the bladder inflates.

9. The vehicle occupant restraint system of claim 6, wherein said vertical webs are formed of impermeable material, said webs having a plurality of holes such that the vertical webs comprise the means by which the flow of gas in the bladder is controlled such that the inner and outer side portions of the bladder inflate before the central portion of the bladder inflates.

10. A method for protecting the occupants of a vehicle equipped with an impact sensor and an occupant restraint system comprising at least one shoulder strap having a front surface and a back surface, one normally uninflated bladder having a vertical central portion attached to the back surface of the shoulder strap, a vertical inner side portion and a vertical outer side portion which extend around the shoulder strap and lie folded on top of the shoulder strap, said bladder comprising two vertical webs extending across the bladder, said webs forming a vertical central chamber in the central portion of the bladder, a vertical inner side chamber in the inner side portion of the bladder, and a vertical outer side chamber in the outer side portion of the bladder, and one gas generator means within a housing on the front face of each of said at least one shoulder strap for generating gas to inflate said bladder member, wherein the housing comprises no ports leading directly into the vertical central chamber, such that the vertical central chamber is fluidly connected to the gas generator only through the vertical inner side chamber and the vertical outer side chamber, comprising the steps of:
(a) detecting an impact with the impact sensor;
(b) transmitting an electrical signal from the impact sensor to the gas generator;
(c) igniting the gas generator and generating an inflating gas;
(d) inflating the inner vertical portion and the outer vertical portions of the bladder such that the inner vertical portion and the outer vertical portion start to deploy; and
(e) inflating the central portion of the bladder when the deployment of the inner vertical portion and the outer vertical portion is substantially complete.

11. The method of claim 10, wherein said vertical webs are formed of impermeable material, said webs having a plurality of holes.

12. The method of claim 10, comprising two shoulder straps and two bladders, wherein each bladder further comprises an upper lobe shaped to support the head upon inflation. further comprising the step of inflating the upper lobe on each bladder to support the head and limit head and neck displacement, said step occurring in conjunction with the step of inflating the inner vertical portion and the outer vertical portions of the bladder.

13. A vehicle occupant restraint system comprising:
(a) at least one shoulder strap having a front surface and a back surface;
(b) gas generating means located on the front surface of each shoulder strap, each gas generating means having an igniter;
(c) an impact sensor electrically connected to each igniter;
(d) one inflatable bladder, having side portions in fluid communication with said gas generating means and a central portion positioned between each shoulder strap and the occupant in fluid communication with said side portions, for lifting each shoulder strap away from the occupant's body, thereby eliminating any slack between the shoulder strap and the occupant, wherein said central portion is attached to the back surface of said shoulder strap, and the side portions lie folded on top of the shoulder strap, said bladder comprising two vertical webs extending across the bladder, said webs forming a vertical central chamber in the central portion of the bladder, a vertical inner side chamber in the inner side portion of the bladder, and a vertical outer side chamber in the outer side portion of the bladder; and
(e) means for controlling the deployment of said inflatable bladder such that the inflatable bladder does not roll out from between the shoulder strap and the occupant,
wherein the gas generator means is located in a housing on the front face of each of said at least one shoulder strap for generating gas to inflate said bladder member, and wherein the housing comprises no ports leading directly into the vertical central chamber, such that the vertical central chamber is fluidly connected to the gas generator only through the vertical inner side chamber and the vertical outer side chamber.

14. The vehicle occupant restraint system of claim 13, wherein the central portion of each inflatable means is attached to the back surface of the shoulder strap, and wherein the outer side portion of the inflatable means is folded on top of the front surface of the shoulder strap, and the inner side portion is folded on top of the outer side portion.

15. A method for protecting the occupants of a vehicle equipped with an impact sensor and an occupant restraint system comprising (i) two shoulder straps, each strap having a front surface and a back surface, (ii) two normally uninflated bladders, each bladder having a vertical central portion, a vertical inner side portion and a vertical outer side portion, the vertical central portion of each bladder being attached to the back surface of one shoulder strap, and the vertical inner portions and the vertical outer portions lie folded on top of a shoulder strap, each of said two bladders comprising two vertical webs extending across the bladder, said webs forming a vertical central chamber in the central portion of the bladder, a vertical inner side chamber in the inner side portion of the bladder, and a vertical outer side chamber in the outer side portion of the bladder, and (iii) one gas generator means positioned within a housing on the front face of each of said shoulder straps for generating gas to inflate each of said two bladder members, wherein the housing comprises no ports leading directly into the vertical central chamber, such that the vertical central chamber is fluidly connected to the gas generator only through the vertical inner side chamber and the vertical outer side chamber, comprising the steps of:

(a) detecting an impact with the impact sensor;
(b) transmitting an electrical signal from the impact sensor to the gas generator;
(c) igniting each gas generator and generating an inflating gas;
(d) inflating the inner vertical portions and the outer vertical portions of each bladder such that the inner vertical portion and the outer vertical portion start to deploy; and
(e) inflating the central portion of each bladder when the deployment of the inner vertical portion and the outer vertical portion is substantially complete.

16. The method of claim 15, wherein each bladder further comprises an upper lobe shaped to support the head upon inflation, further comprising the step of inflating the upper lobe of each bladder to support the head and limit head and neck movement, said step occurring in conjunction with the step of inflating the inner vertical and outer vertical portions of each bladder.

17. A vehicle occupant restraint system, comprising:
(a) two shoulder straps;
(b) two normally uninflated bladders having side portions and a central portion, the central portion of each bladder being attached to the back surface of one of said two shoulder straps, wherein the side portions of each of said two bladders extend around the shoulder straps such that each side portion lies folded on top of the shoulder straps, wherein each of said two bladders comprises two vertical webs extending across the bladder, said webs forming a vertical central chamber in the central portion of the bladder, a vertical inner side chamber in the inner side portion of the bladder, and a vertical outer side chamber in the outer side portion of the bladder;
(c) one housing positioned on the front face of each shoulder strap, said housing comprising an airtight manifold, said manifold having two ports, one port leading into said vertical inner side chamber, and one port leading into said vertical outer side chamber, said manifold having no ports leading directly into the vertical central chamber, such that the vertical central chamber is fluidly connected to the gas generator only through the vertical inner side chamber and the vertical outer side chamber;
(d) one gas generator means positioned within each of said housing for generating gas to inflate the side portions of the bladder; and
(e) means for controlling the flow of gas from the side portions to the central portion of each bladder, such that the vertical chambers in the vertical inner and vertical outer side portions of each bladder inflate before the vertical central chambers in the central portions of the bladders inflate.

18. The occupant restraint system of claim 17, wherein the means for controlling the flow of gas from the side portions to the central portion of each bladder comprises vertical webs fabricated from permeable material.

19. The occupant restraint system of claim 17, wherein the inner portion of each bladder comprises an upper lobe, said upper lobes cooperating to support the occupant's head, and to limit displacement of the head and neck upon inflation.

* * * * *